United States Patent [19]
Hays

[11] Patent Number: 5,682,759
[45] Date of Patent: Nov. 4, 1997

[54] TWO PHASE NOZZLE EQUIPPED WITH FLOW DIVIDER

[76] Inventor: Lance Gregory Hays, 2737 Ridgepine, LaCrescenta, Calif. 91214

[21] Appl. No.: 607,827

[22] Filed: Feb. 27, 1996

[51] Int. Cl.⁶ ..................................................... F25D 9/00
[52] U.S. Cl. ........................... 62/402; 62/511; 62/910
[58] Field of Search ............................ 62/402, 511, 910

[56] References Cited

U.S. PATENT DOCUMENTS

| | | | |
|---|---|---|---|
| 3,628,342 | 12/1971 | Becker | 62/910 |
| 4,430,868 | 2/1984 | Kern et al. | 62/511 |
| 5,246,575 | 9/1993 | Alexander | 62/910 |
| 5,305,610 | 4/1994 | Bennett et al. | 62/910 |
| 5,467,613 | 11/1995 | Brasz | 62/402 |

*Primary Examiner*—Ronald C. Capossela
*Attorney, Agent, or Firm*—Harris Beach & Wilcox, LLP

[57] ABSTRACT

A two-phase nozzle having a converging diverging configurations is equipped with a flow divider at its inlet. The flow divider is arranged to act upon an incoming flow of two-phase liquid to break the liquid phase into finely divided droplets which are directed into the nozzle entrance region so that minimum contact is made with the inside wall of the nozzle. The finely divided droplets are thus thoroughly dispersed in the gas phase of the mixture producing maximum acceleration of the fluid through the nozzle.

15 Claims, 4 Drawing Sheets

TWO PHASE NOZZLE EQUIPPED WITH FLOW DIVIDER

BACKGROUND OF THE INVENTION

This invention relates to apparatus for acting upon a two-phase mixture as it enters a nozzle to insure that the liquid phase of the mixture is dispersed uniformly into fine droplets within the gas phase as it moves through the nozzle.

More specifically, this invention relates to compression/expansion refrigeration apparatus containing a turbine-expander and a flow divider at the entrance to the turbine-expander inlet nozzle which acts upon a two phase mixture of refrigerant as it passes into the nozzle to uniformly disperse the liquid phase of the mixture into finely divided droplets within the gas phase of the mixture.

The use of a turbine expander in a refrigeration system to throttle refrigerant from the high pressure side of the system to the low pressure side of the system. The turbine is coupled to the system compressor along with the compressor prime mover and some of the energy contained in the high pressure refrigerant is recovered in the expander to help drive the compressor. A system of this type is disclosed in application Ser. No. 222,966 filed Jan. 25, 1995, the disclosure of which is included herein by reference now U.S. Pat. No. 5,467,613.

Efficient acceleration of the two phase mixture as it moves through the inlet nozzle of the turbine/expander is essential for high efficient operation of the expander. For efficient acceleration of the two-phase mixture it is important that the liquid phase of the mixture be well dispersed within the gas phase. Typically, operation of the nozzles with a continuous liquid phase at the inlet of the nozzle results in poor nozzle performance which, in turn, adversely effects the turbine-expander performance. Large pockets of gas within the liquid phase of the mixture are formed in the flow moving through the nozzle resulting in a high degree of slippage between the gas and liquid phases. High friction losses are thus encountered in the flow reducing the acceleration of the mixture through the nozzle.

Apparatus has been developed to produce a more uniform dispersion of the liquid phase into the gas phase in a two phase nozzle, however, these devices are relatively complex and costly to implement.

SUMMARY OF THE INVENTION

It is therefore an object of the present invention to improve two-phase nozzles.

A further object of the present invention is to provide a simple and inexpensive flow divider for uniformly dispersing the liquid phase of a two-phase mixture at the inlet of the two phase nozzle.

A still further object of the present invention is to provide for high acceleration of a two phase mixture through the nozzle for use in a turbine expander.

Yet a further object of the present invention is to improve refrigeration systems utilizing turbine expanders for passing refrigerant from the high pressure side of the system to the low pressure side of the system.

Another object of the present invention is to more efficiently recover energy from a two-phase mixture used to drive a turbine-expander or similar apparatus.

Yet another object of the present invention is to increase the amount of work produced by a turbine expander employing a two phase working fluid.

These and other objects of the present invention are attained in a compression-expansion refrigeration system that includes a fill refrigerant. A rotary compressor having an input shaft is coupled to both a prime mover and a turbine expander. High pressure refrigerant is passed through a condenser. and a two phase mixture leaving the condenser enters a two phase nozzle at the inlet of the turbine entrance. A flow divider is operatively associated with the nozzle which functions to disperse the liquid phase of the mixture entering the nozzle into fine droplets which are uniformly dispersed in the gas phase to increase the acceleration of the mixture as it passes through the nozzle. The refrigeration is expanded as it passes through the turbine expander to produce work and is then passed through the system evaporator and returned to the compressor and is then returned to the inlet of the compressor through an evaporator.

In one embodiment of the invention, the mixture is passed through a restricted section in the flow divider to create a liquid film along the inner surface of the divider. The liquid film is passed over a step to disperse the liquid into finely divided droplets which are directed into the nozzle at an angle so that it will not attach itself to the wall of the nozzle.

In another embodiment of the invention incoming working fluid is passed through tubes situated at the entrance of the nozzle to produce a controlled pressure drop in the working fluid so that the pressure in the working fluid entering the nozzle is below the saturation pressure of the fluid. This results in the formation of a vapor phase in the flow causing disruption of flow and uniform dispersement of fine droplets in the mixture entering the nozzle.

BRIEF DESCRIPTION OF THE DRAWINGS

For a better understanding of these and other objects of the present invention, reference is herein made to the following detailed description of the invention which is to be read in association with the following drawings, wherein.

DESCRIPTION OF THE INVENTION

Figure 1:
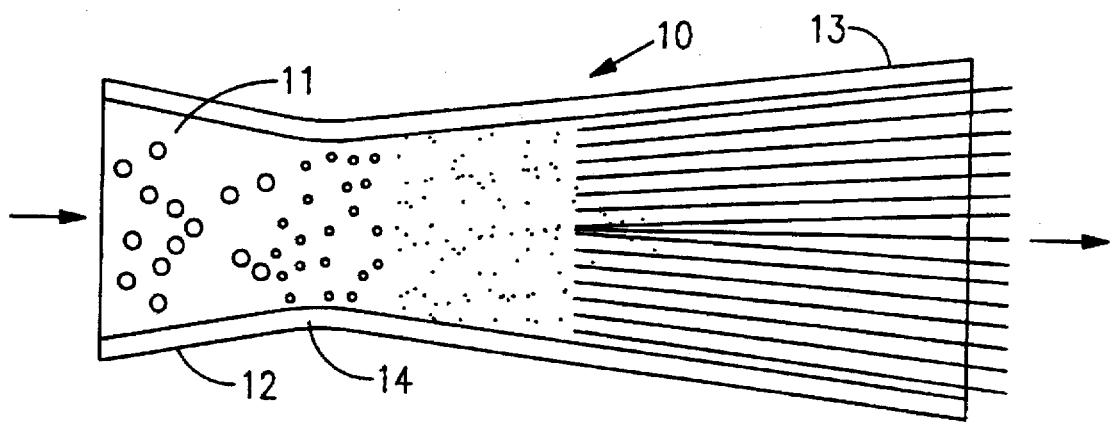
FIG. 1 is a side elevation, in section, showing a converging/diverging two phase nozzle illustrating an ideal flow pattern through the nozzle for producing efficient acceleration of a two phase mixture through the nozzle.

Turning initially to FIG. 1, there is shown schematically a two phase nozzle generally referenced 10, illustrating an ideal flow pattern for accelerating a two phase mixture 11 through the nozzle. The nozzle has a converging/diverging configuration having a converging entrance section 12 and a diverging exit section 13 that are connected by a throat 14. The nozzle basically functions as an open system for receiving a two phase mixture and guiding the fluid to a lower pressure to convert a portion of the internal energy of the fluid to kinetic energy for performing work.

As shown in FIG. 1, in the ideal case liquid droplets and gas flow into the nozzle. The gas phase is accelerated by a negative pressure gradient produced in the nozzle. This, in turn, builds up shear forces causing the liquid phase to shatter into smaller and smaller droplets as the flow moves through the throat region. The fine droplets are uniformly dispersed within the gas phase as the mixture is expanded through the exit region of the nozzle thereby efficiently accelerating the flow through the nozzle.

This type of high efficient flow acceleration is required in many applications, however, it has heretofore been difficult to attain in practice because of the formation of relatively large pockets of gas in the nozzle which results in slippage between the gas and liquid phases. This, in turn, produces relatively high friction losses in the nozzle and results in inefficient acceleration of the working fluid.

Figure 2:
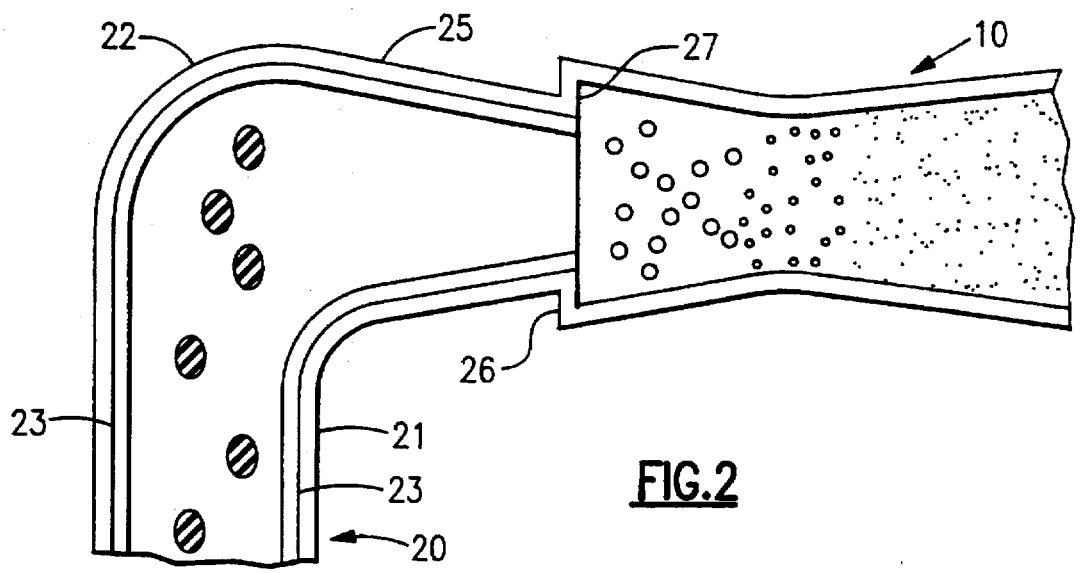
FIG. 2 is a side elevation in section showing a two phase nozzle equipped with a flow divider for accelerating a two phase mixture through the nozzle.

A two phase nozzle 10 is shown in FIG. 2 that is equipped with a simple flow divider 20 at its entrance that is designed to produce relatively ideal two phase flow acceleration through the nozzle 10. The circular inlet line 21 that brings the working substance to the nozzle entrance furnished with a pronounced bend 22 that transcends an arc of about 90°. A liquid film 23 begins to form along the inside wall of the inlet line 21 due to centrifugal forces as well as relatively large droplets in the gas phase. The line has a necked down or restricted section 25 on the downstream side of the bend. The restricted section of the inlet line 21 coacts with a vertical wall 26 at the entrance of the nozzle to establish a step 27 over which the liquid film flows. The liquid film is separated from the inner wall of the inlet line as it passes over the step. The restricted section of the inlet line converges inwardly toward the nozzle entrance whereby the entering flow made minimal contact with the inner wall of he nozzle. The liquid in the film leaving the step thus disintegrates into fine droplets which become uniformly dispersed in the gas flow as the two phase mixture passes through the nozzle.

Figure 3:
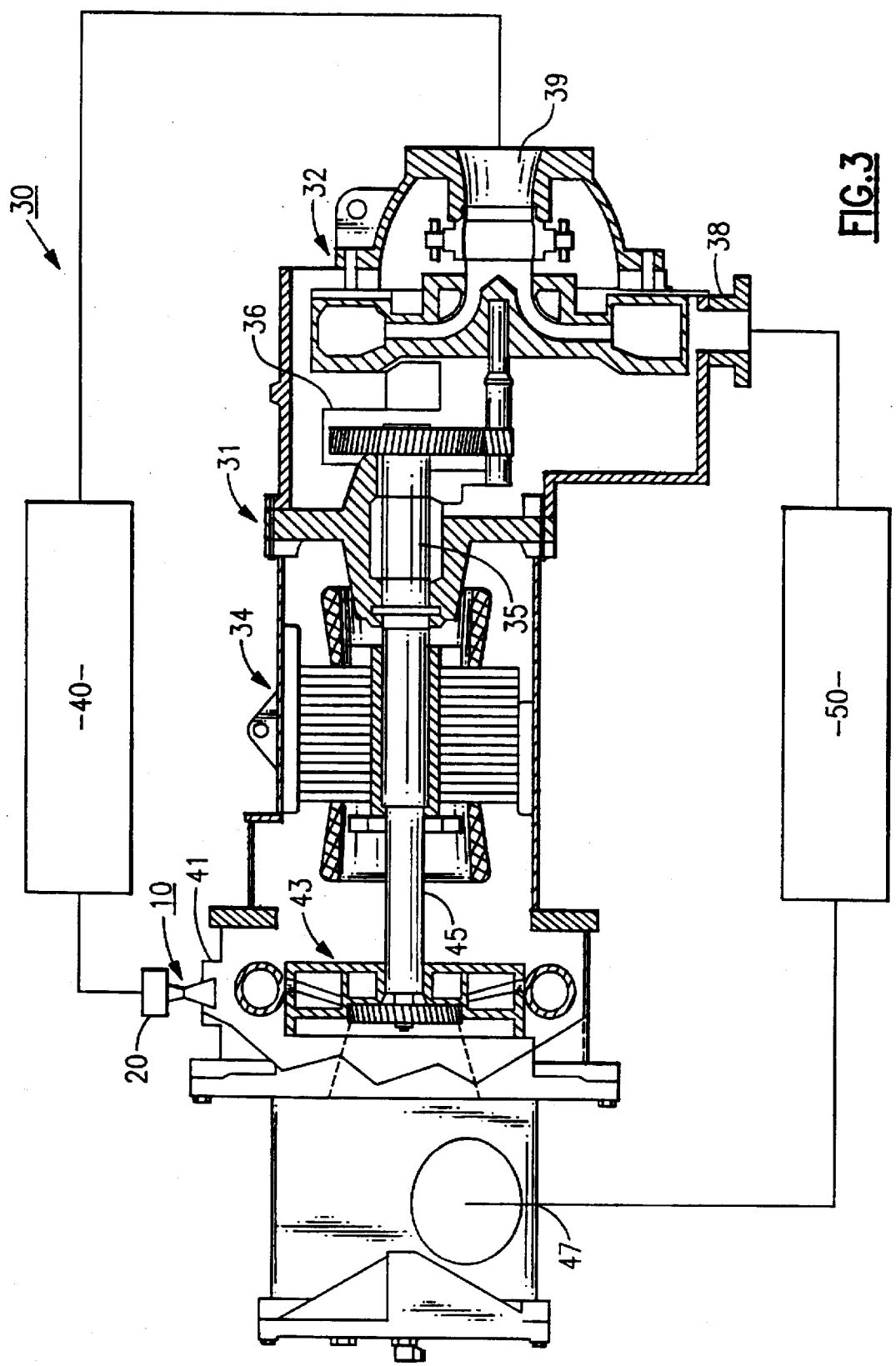
FIG. 3 is a schematic view of a refrigeration system that is equipped with a turbine expander employing a two phase flow accelerator shown in FIG. 2.

FIG. 3 illustrates schematically a refrigeration system 30 in which a turbine-expander 31 is employed to throttle refrigerant from the high pressure side of the system to the low pressure side thereof. This refrigeration system is described in greater detail in the previously noted application Ser. No. 222,966 filed Apr. 5, 1994 now U.S. Pat. No. 5,467,613. A system compressor 32 is connected to a prime mover 34, which in this case, is an electric motor, by means of drive shaft 35 and gear box 36. The compressor is arranged to receive refrigerant at inlet 38 and functions to raise the pressure and temperature of the refrigerant to a desired level.

The refrigerant leaves the compressor via the compressor outlet 39 in the form of a vapor or a superheated vapor and is passed through a condenser unit 40 where the vapor is reduced ideally to a liquid. The refrigerant is delivered then into the inlet 41 of a turbine expander 43 via a two phase nozzle 10 (FIG. 1 ). The nozzle is equipped with a flow divider 20 (FIG. 2) which acts upon the two phase mixture leaving the condenser to accelerate the flow through the nozzle as explained above. The accelerated mixture is directed by the nozzle into the turbine expander to drive the turbine. The turbine shaft 45 is coupled to the compressor drive shaft 35. The working fluid is expanded in the turbine from a high pressure to a lower pressure thereby converting some of the energy in two phase fluid into work which helps to drive the compressor.

The low pressure fluid leaves the turbine via the turbine outlet 47 and is then passed through an evaporator chiller 50 and returned to the inlet 38 of the compressor thereby completing the cycles. The working fluid which is now at a low pressure and temperature absorbs heat in the evaporator to convert the refrigerant to a vapor.

Figure 4:
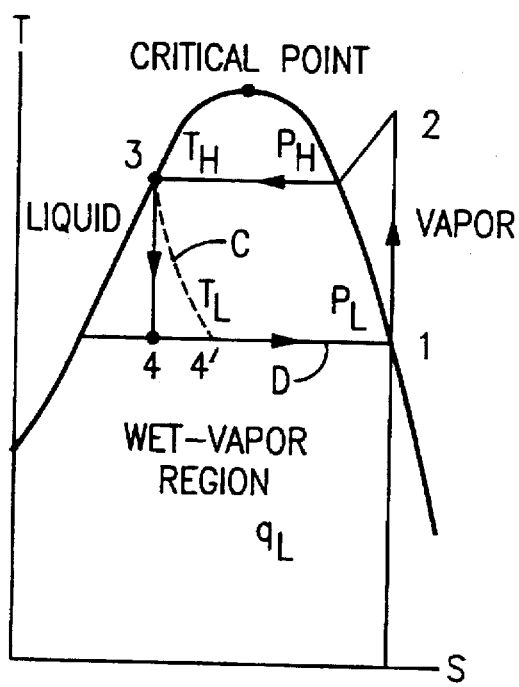
FIG. 4 is a temperature enthopy diagram illustrating the thermodynamic cycle of the system shown in FIG. 3.

The refrigerant compression thermodynamic cycle for the system is shown on a temperature entropy diagram in FIG. 4. The refrigerant enters compression at some given temperature ($T_1$) in a vapor state. The vapor is then passed through the compressor and leaves at state point 2 as a superheated vapor. The vapor passes through the condenser from state point 2 to state point 3 where it is ideally reduced to a liquid at a constant temperature. ($T_2$).

In a typical refrigeration system utilizing a throttling valve in place of the previously disclosed turbine expander, the working fluid undergoes an isenthalpic expansion from state point 3 to state point 4' as indicated by the dotted line C. As can be seen from the diagram, the use of the turbine expander allows for a higher fraction of liquid refrigerant to enter the evaporator when compared to the typical system utilizing a throttling valve or capillary tube. The evaporator thus can furnish a greater amount of cooling when compared to these other systems. With high pressure refrigerants, the throttling loss through a standard expansion valve may be as high as 20%. Replacing the standard throttling valve with a turbine expander having an operating efficiency of 50% results in a significant improvement in overall system efficiency. With the use of a two phase nozzle equipped with a flow divider, the efficiency of the system is even further increased.

Figure 5:
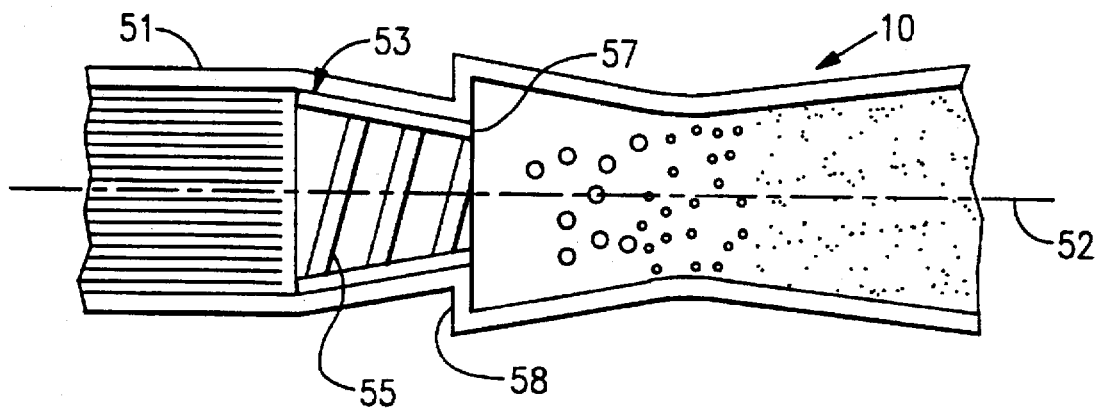
FIG. 5 is a side elevation in section showing a further embodiment of the invention for accelerating a two phase mixture through a nozzle.

FIG. 5 is another embodiment of a flow divider 50 suitable for use with a two phase nozzle 10. The inlet line 51 leading to the nozzle entrance is tapered downwardly about the axis 52 of the nozzle. A conical shaped plug 53 is mounted in the tapered section of the inlet line which fits snugly therein. A series of helical grooves 55 are formed in the inner wall of the plug. The liquid phase of the incoming flow forms a liquid film along the inner wall of the plug due to friction and the helical groove produce a swirling pattern in the flow stream. The liquid film again is caused to flow from the plug annulus over a step 57 that forms an acute angle with the vertical back wall 58 of the nozzle. Accordingly, the liquid film disintegrates into finely dispersed droplets which enter the nozzle with a minimum amount of contact with the inner wall of the nozzle. Again, this results in highly efficient acceleration of the mixture through the nozzle.

Figure 6:
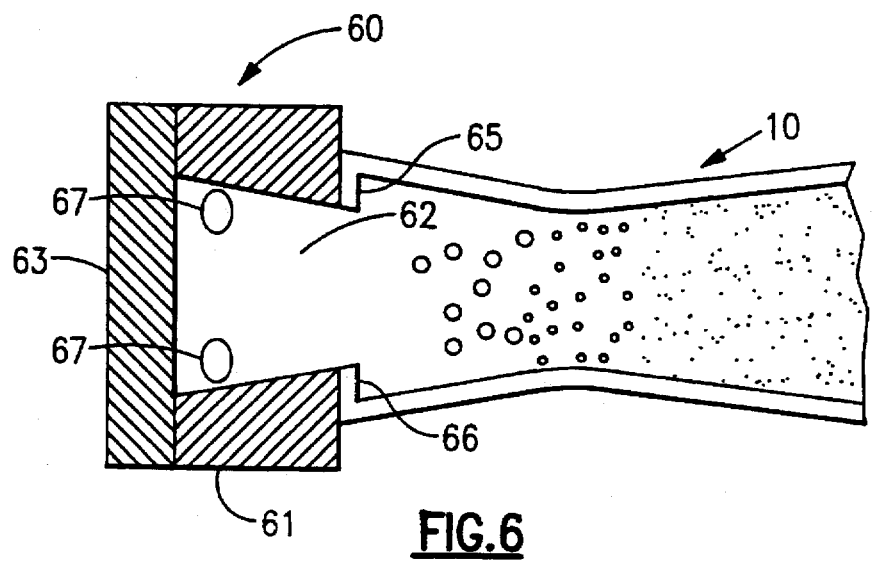
FIG. 6 is a side elevation in section showing a two phase nozzle equipped with a flow accelerator wherein a two phase mixture is passed tangentially into a conical chamber.

FIG. 6 is a still further embodiment of the invention. Here a flow divider 60 is again coupled to a two-phase nozzle 10 as described above. The flow divider includes an annular housing 61 containing a conical-shaped chamber 62 formed therein that opens into the entrance region of the nozzle. The chamber converges from back wall 63 toward the nozzle entrance and forms an acute angle with vertical wall 65 to form a step 66 at the entrance to the nozzle. The working substance is introduced into the chamber via one or more inlet ports 67 that are arranged to direct the incoming flow tangent to the inner wall of the chamber. Here again, the tangential flow of two-phase fluid causes a liquid film to be established along the inner wall surface which moves along a circular flow path toward the nozzle entrance. As the film moves over the step, it is broken into finely divided droplets which again are directed into the nozzle so that minimum contact is made with the inner wall of the nozzle. This provides for maximum acceleration of the fluid through the nozzle.

Figure 7:
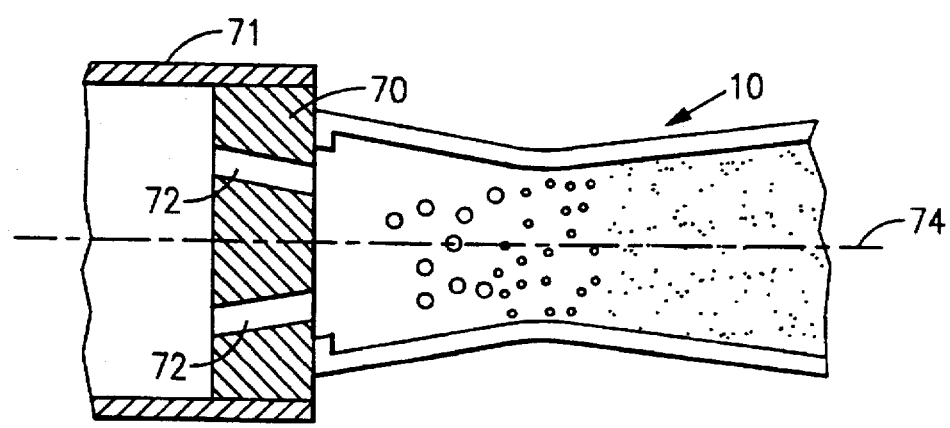
FIG. 7 is a side elevation of a flow divider having a baffle plate with passages formed therein for reducing the pressure in the flow below the saturation pressure of the mixture and directing the flow into the nozzle.

Turning now to FIG. 7, there is illustrated a still further embodiment of the invention. A baffle plate 70 is mounted within the inlet line 71 to the two-phase nozzle 10. A series of equally spaced passages 72 are formed in the baffle plate. The passages are sized to pass the required flow to the two-phase nozzle. The working substance entering the passages is accelerated by a pressure drop created by the nozzle so that pressure in the flow leaving the passages is below the saturation pressure of the working substance. This results in the formation of a vapor phase within the fluid moving through the passages producing a disruption in the flow and the formulation of finely dispersed liquid droplets within the entrance region of the nozzle. The passages are formed in the plate at an angle with regard to the axis 74 of the nozzle thus minimizing contact of the issuing fluid with the inside wall of the nozzle. This again results in highly efficient acceleration of the mixture through the two-phase nozzle.

While this invention has been described with reference to the embodiments described above, it is apparent that the invention is not limited by these embodiments and any modifications or variations will present themselves to those skilled in the art, without departing from the spirit of this invention, as defined in the appended claims.

What is claimed is:

1. Apparatus for increasing the acceleration of a two-phase working substance through a nozzle that includes
    a two-phase nozzle having an entrance for receiving a flow of a two-phase working substance and expanding the working substance to a lower pressure to convert at least a portion of the energy in the flow to kinetic energy,
    a flow divider connected to the entrance of said nozzle for directing said two-phase working substance into said nozzle,
    said flow divider having means for separating the liquid phase of the working substance in the flow from the gas phase and dispersing the liquid phase into finely divided droplets, and
    said flow divider further including means for directing the droplets inwardly toward the central axis of the nozzle.

2. The apparatus of claim 1 wherein said flow divider has a conical-shaped converging restricted section adjacent to the entrance to the nozzle for developing a liquid film along the inner wall surface of said restricted section, and a step means at the entrance to said nozzle for acting upon said liquid film to disperse said film into fine droplets.

3. The apparatus of claim 2 wherein said step includes a vertical wall at the entrance to said nozzle that forms an acute angle with the outer wall of the converging section of said flow divider.

4. The apparatus of claim 2 wherein said restricted section of said flow divider has helical grooves formed in the inner wall surface of said section.

5. The apparatus of claim 2 wherein said flow divider has at least one entry port for bringing refrigerant into the converging section tangent to the inner wall surface of said conical section to impact a swirling motion to said refrigerant moving therethrough.

6. The apparatus of claim 1 wherein said flow divider includes a baffle plate mounted within an inlet line to the nozzle, said baffle plate having a series of passages formed therein that are arranged to pass a desired flow to said nozzle and to reduce the pressure in the flow below the saturation pressure of the working substance.

7. A compression/expansion refrigeration apparatus which includes a fill of two-phase refrigerant,
    a rotary compressor having an input shaft that is coupled to a drive motor and to a turbine expander for compressing refrigerant to a high pressure, whereby the refrigerant leaves the compressor in a vapor state,
    a first heat exchanger connected between a compressor outlet and a turbine expander inlet for condensing the refrigerant wherein the refrigerant leaves the first heat exchanger at about saturation,
    a two phase nozzle mounted at the inlet to said turbine expander for guiding the entering two phase mixture to a lower pressure to convert some of the energy in said entering mixture to kinetic energy,
    flow divider connected to the entrance of said two phase nozzle having means for separating the liquid phase from the two-phase refrigerant flow prior to the flow entering the nozzle and dispersing the liquid phase into finely divided droplets to accelerate the flow of refrigerant through the nozzle, and
    a second heat exchanger connected between the turbine expander outlet and the compressor inlet wherein the refrigerant is further expanded prior to entering said compressor.

8. The apparatus of claim 7 wherein said flow divider has a conical shaped restricted section for developing a liquid film along the inner wall of the restricted section and a step means for contacting the film at the entrance to the nozzle to disperse the liquid phase into finely divided droplets within the gas phase.

9. The apparatus of claim 8 wherein the restricted converging section of the flow divider is arranged to direct the flow of refrigerant entering the nozzle away from the inner wall surface of the nozzle to minimize refrigerant contact with said wall.

10. The apparatus of claim 8 wherein the flow divider further includes a bend section at the entrance to the restricted section to further enhance the formation of a liquid film along the inner wall of the flow divider.

11. The apparatus of claim 8 wherein said step means further includes a front wall at the entrance to said nozzle that is perpendicular to the central axis of the nozzle, said front wall further establishing an acute angle with an outer wall of said restricted section of said flow divider.

12. The apparatus of claim 8 wherein said flow divider further includes means to introduce refrigeration into the converging section of the divider tangent to the inner wall surface of the converging section to impart a circular flow component to the refrigerant as it moves into the nozzle.

13. The apparatus of claim 8 wherein said flow divider contains helical grooves formed in the inner wall surface of said converging restricted section.

14. The apparatus of claim 7 wherein said flow divider further includes a baffles plate mounted inside an inlet line connected to the entrance to said nozzle, a plurality of passages passing through said baffle plate, said passages being sized to pass a desired refrigerant flow to said nozzle and to reduce the pressure in the refrigerant flow entering the nozzle below the saturation pressure of said refrigerant.

15. The apparatus of claim 7 wherein said passages are formed at an angle to direct refrigerant away from the inner wall surface of said nozzle.

* * * * *